(12) United States Patent
Mizuno et al.

(10) Patent No.: US 7,124,015 B2
(45) Date of Patent: Oct. 17, 2006

(54) CONTROL APPARATUS FOR PLANT

(75) Inventors: Takahide Mizuno, Wako (JP); Yuji Yasui, Wako (JP); Yoshihisa Iwaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/486,519

(22) PCT Filed: May 28, 2003

(86) PCT No.: PCT/JP03/06628

§ 371 (c)(1),
(2), (4) Date: Feb. 12, 2004

(87) PCT Pub. No.: WO2004/006029

PCT Pub. Date: Jan. 15, 2004

(65) Prior Publication Data

US 2004/0199323 A1 Oct. 7, 2004

(30) Foreign Application Priority Data

Jul. 5, 2002 (JP) .................... 2002-196697

(51) Int. Cl.
*F02D 41/14* (2006.01)
*G05B 13/04* (2006.01)
*G01S 15/12* (2006.01)

(52) U.S. Cl. .................... 701/109; 701/31; 701/301; 701/93

(58) Field of Classification Search ............ 701/109, 701/301, 93; 700/31; 340/436

See application file for complete search history.

(56) References Cited

U.S. PATENT DOCUMENTS 5,692,485 A * 12/1997 Maki et al. .................. 123/684

FOREIGN PATENT DOCUMENTS

| JP | 63-143608 | 6/1988 |
|---|---|---|
| JP | 1-285636 A | 11/1989 |
| JP | 06-291689 | 10/1994 |
| JP | 7-247886 A | 9/1995 |
| JP | 8-189400 A | 7/1996 |
| JP | 11-73206 | 3/1999 |
| JP | 11-224101 | 8/1999 |
| JP | 11-324782 | 11/1999 |
| JP | 11-8936 | 12/1999 |
| JP | 2000-234550 | 8/2000 |

* cited by examiner

Primary Examiner—Stephen K. Cronin
Assistant Examiner—Arnold Castro
(74) Attorney, Agent, or Firm—Squire, Sanders & Dempsey LLP

(57) ABSTRACT

The present invention provides a control apparatus for a plant, which can suppress excessive correction for a spiky disturbance being applied and maintain a good controllability, when controlling the plant, which is a controlled object, with the self-tuning regulator. A detected equivalent ratio KACT is input to a high-pass filter 33, and a high-pass filter output KACTHP is input to a parameter adjusting mechanism 42. The parameter adjusting mechanism 42 calculates a corrected updating vector (KID·dθ(k)) by multiplying an updating component dθ of a model parameter vector by a correction coefficient KID, and adds the corrected updating vector to a preceding value θ(k−1) of the model parameter vector, to thereby calculate a present value θ(k). The correction coefficient KID is changed from "1.0" to a value near "0" upon detection of the spiky response where an absolute value of the high-pass filter output KACTHP increases.

27 Claims, 13 Drawing Sheets

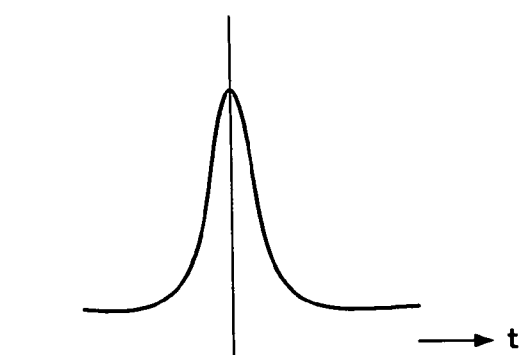
*FIG. 8A*
*FIG. 8B*
*FIG. 8C*
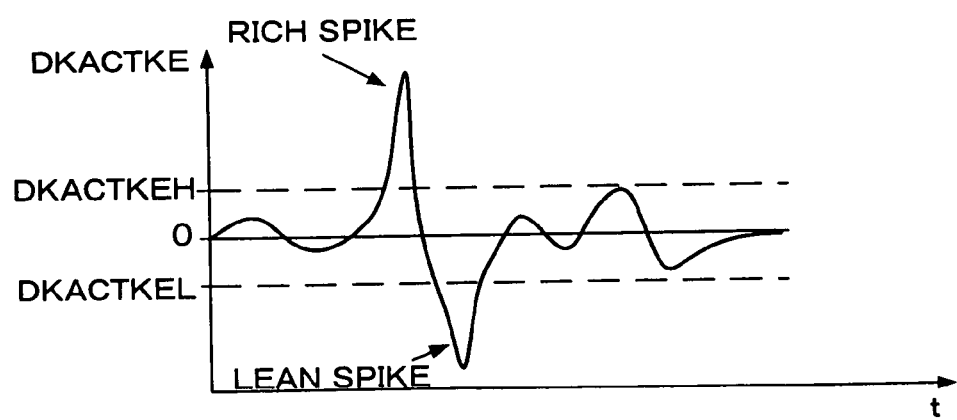
*FIG. 9*

CONTROL APPARATUS FOR PLANT

TECHNICAL FIELD

The present invention relates to a control apparatus for a plant, particularly to a control apparatus having a self-tuning regulator that identifies one or more model parameter of a controlled object model which is obtained by modeling the plant, and controls the plant using the identified model parameter.

BACKGROUND ART

An example of a control apparatus for a plant, which controls an air-fuel ratio of an air-fuel mixture supplied to an internal combustion engine, is described in Japanese Patent Laid-open No. 11-73206. This control apparatus controls the air-fuel ratio using a self-tuning regulator having a parameter adjusting mechanism which functions as an identifier for identifying model parameters of the controlled object model.

In this control apparatus, a self-tuning correction coefficient KSTR is calculated by the self-tuning regulator according to the air-fuel ratio detected by an air-fuel ratio sensor provided in the exhaust system of the engine, and an amount of fuel to be supplied to the engine is controlled with the self-tuning correction coefficient KSTR.

When applying the above conventional control apparatus to a control of the internal combustion engine mounted on a vehicle, a problem that an emission amount of NOx increases upon deceleration of the vehicle caused by a quick return of the depressed accelerator pedal, or upon changing a gear position of a transmission of the vehicle, is confirmed.

When the accelerator pedal is quickly returned, an amount of intake air of the engine quickly decreases, and the fuel adhered to an inner wall of the intake pipe is supplied to the combustion chamber. Accordingly, the air-fuel ratio detected by the air-fuel ratio sensor indicates a spiky change to a richer air-fuel ratio (a change of quickly protruding and returning is hereinafter referred to as a "spike" or a "spiky change"). Therefore, in order to rapidly correct this change in the air-fuel ratio, the self-tuning regulator makes the self-tuning correction coefficient KSTR quickly decrease. As a result, the air-fuel ratio becomes over-lean immediately after the quick return of the accelerator pedal, which makes the emission amount of NOx increase.

FIGS. 14A to 14C respectively show changes in a detected equivalent ratio KACT, the self-tuning correction coefficient KSTR, a target equivalent ratio KCMD, the vehicle speed VP, and the NOx emission amount. The detected equivalent ratio KACT, shown by a thick line in FIG. 14A, is obtained by converting the air-fuel ratio detected by the air-fuel ratio sensor to an equivalent ratio. The target equivalent ratio KCMD, shown by a thin line in FIG. 14A, is obtained by converting a target air-fuel ratio to an equivalent ratio. The self-tuning correction coefficient KSTR is shown by a broken line in FIG. 14A. As shown in FIG. 14B, when a gear change is performed, a rich spike of the detected equivalent ratio KACT is generated, which causes the self-tuning correction coefficient KSTR to quickly change in the lean direction. Accordingly, a lean spike is generated immediately after the rich spike of the detected equivalent ratio KACT. As a result, the NOx emission amount temporarily increases as shown in FIG. 14C.

When applying the PID (proportional, integral, and differential) control to the air-fuel ratio control of the internal combustion engine, the above-described problem does not occur, since the response speed of the PID control is relatively slow. It is considered that the above-described problem is caused since the control by the self-tuning regulator has very high speed response characteristic.

DISCLOSURE OF INVENTION

The object of the present invention is to provide a control apparatus for a plant, which can suppress excessive correction for a spiky disturbance being applied and maintain a good controllability, when controlling the plant, which is a controlled object, with the self-tuning regulator.

To attain the above object, the present invention provides a control apparatus for a plant, that controls the plant with a self-tuning regulator having identifying means for identifying at least one model parameter ($\theta$) of a controlled object model which is obtained by modeling the plant. The self-tuning regulator uses the at least one model parameter ($\theta$) identified by the identifying means. The control apparatus further includes spiky response detecting means for monitoring a parameter (KACT, KSTR) indicative of an output of the plant to detect a spiky response output. The identifying means includes modifying means for modifying an updating rate of the at least one model parameter ($\theta$) to a lower rate, when the spiky response output is detected by the spiky response detecting means.

With this configuration, the parameter indicative of the output of the plant is monitored, and the updating rate of the at least one model parameter is modified to a lower rate, when the spiky response output is detected. In the self-tuning regulator, a control deviation between the plant output and the control target value is largely reduced by updating the at least one model parameter. Accordingly, the follow-up performance of the control temporarily becomes lower by modifying the updating rate to a lower rate. As a result, an excessive correction corresponding to the spiky response output of the plant is suppressed, which makes it possible to maintain good controllability.

Preferably, the identifying means further includes updating component calculating means for calculating at least one updating component ($d\theta$) corresponding to the at least one model parameter, and updating component correcting means for calculating at least one corrected updating component (KID·$d\theta$) by multiplying a correction coefficient (KID) by the at least one updating component ($d\theta$). The identifying means calculates a present value ($\theta(k)$) of the at least one model parameter by adding at least one corrected updating component (KID·$d\theta$) to a preceding value ($\theta(k-1)$) of the at least one model parameter. The modifying means modifies the correction coefficient (KID) so that an absolute value of the correction coefficient decreases, when the spiky response output is detected by the spiky response detecting means.

With this configuration, the preceding value of the at least one model parameter is maintained, and only the at least one updating component is changed in the decreasing direction. Therefore, better controllability or stability of the control is obtained after the spiky disturbance disappears, compared with a method of maintaining the at least one model parameter at a predetermined value.

Preferably, the spiky response detecting means includes filtering means for performing a high-pass filtering of the parameter (KACT, KSTR) indicative of the output of the plant, and detects the spiky response output according to an output (KACTHP) of the filtering means.

With this configuration, a high-pass filtering of the parameter indicative of the output of the plant is performed, and the spiky response output is detected according to the high-pass filtered parameter. Accordingly, a response output due to steady disturbance is not wrongly determined as the spiky response output. This makes it possible to accurately detect the spiky response output.

Preferably, the spiky response detecting means includes average value calculating means for calculating an average value (KACTHPAV, KACTHPAVL) by averaging absolute values of a present output (KACTHP(n), KACTHPL(n)) and a stored output (KACTHP(n−nHPD1), KACTHPL(n−nHPD2)) of the filtering means, which was stored at a time a predetermined time period before, and determines that the spiky response has been output, when the average value exceeds a predetermined threshold value (KACTTH, KACTTHL).

The predetermined time period is set according to a delay characteristic of the high-pass filtering process.

With this configuration, the average value of a present output and a stored output of the filtering means stored at a time the predetermined time period before, is calculated, and it is determined that the spiky response has been output, when the average value exceeds a predetermined threshold value. When the spiky response is output, a possibility that the present value of the high-pass filtered parameter becomes a value near "0" is high, and therefore a possibility of wrong determination becomes high, if the determination whether or not the spiky response is output is performed according to only the present value of the high-pass filtered parameter. Therefore, the average value of the present output and the output stored at a time the predetermined time period before is used for the determination. This makes it possible to accurately detect the spiky response output.

Preferably, the spiky response detecting means determines a direction of the spiky response output and detects only a spiky response output having a predetermined direction.

With this configuration, it is possible to maintain the updating rate of the at least one model parameter when the spiky response output having a direction other than the predetermined direction is detected, as well as to lower the updating rate of the at least one model parameter only when the spiky response output having the predetermined direction is detected.

Preferably, the parameter indicative of the output of the plant is an output (KSTR) of the self-tuning regulator.

With this configuration, the output of the self-tuning regulator is used as the parameter indicative of the output of the plant. The output of the self-tuning regulator rapidly responds to a change in the output of the plant. Therefore, The output of the self-tuning regulator can be used as the parameter indicative of the output of the plant. It is advantageous to use the output of the self-tuning regulator as the parameter indicative of the output of the plant, when the output of the plant includes noises.

Preferably, the plant includes an engine system having an internal combustion engine (1) and fuel supplying means (6) for supplying fuel to the engine, and the self-tuning regulator calculates a parameter (KSTR) that determines a control input to the engine system so that an air-fuel ratio (KACT) of an air-fuel mixture supplied to the engine coincides with a target air-fuel ratio (KCMD).

With this configuration, an air-fuel ratio of the air-fuel mixture supplied to the engine is controlled by the self-tuning regulator. Accordingly, when the air-fuel ratio of the air-fuel mixture supplied to the engine indicates a spiky change, it possible to suppress an excessive correction, and maintain good controllability.

Preferably, a filtering characteristic of the high-pass filtering is changed according to an operating condition (GAIRCYL) of the engine.

There is a tendency that high-frequency components included in the spiky response output increase as the load on the engine increases. Therefore, by changing the characteristic of the high-pass filtering process corresponding to such tendency, the spiky response can more accurately be detected.

Preferably, the predetermined threshold value (KACTTH, KACTTHL) is changed according to an operating condition (GAIRCYL) of the engine.

There is a tendency that the spiky response becomes more unlikely to occur, as the load on the engine decreases. Therefore, by changing the predetermined threshold value corresponding to such tendency, the spiky response can more accurately be detected.

BRIEF DESCRIPTION OF DRAWINGS

FIGS. 8A–8C are time charts illustrating a method of calculating an average value (KACTHPAV) after the high-pass filtering process shown in FIG. 7;

FIG. 9 is a time chart illustrating a spike detection in the process shown in FIG. 7;

BEST MODE FOR CARRYING OUT THE INVENTION

Some embodiments of the present invention will now be described with reference to the drawings.

FIRST EMBODIMENT

Figure 1:
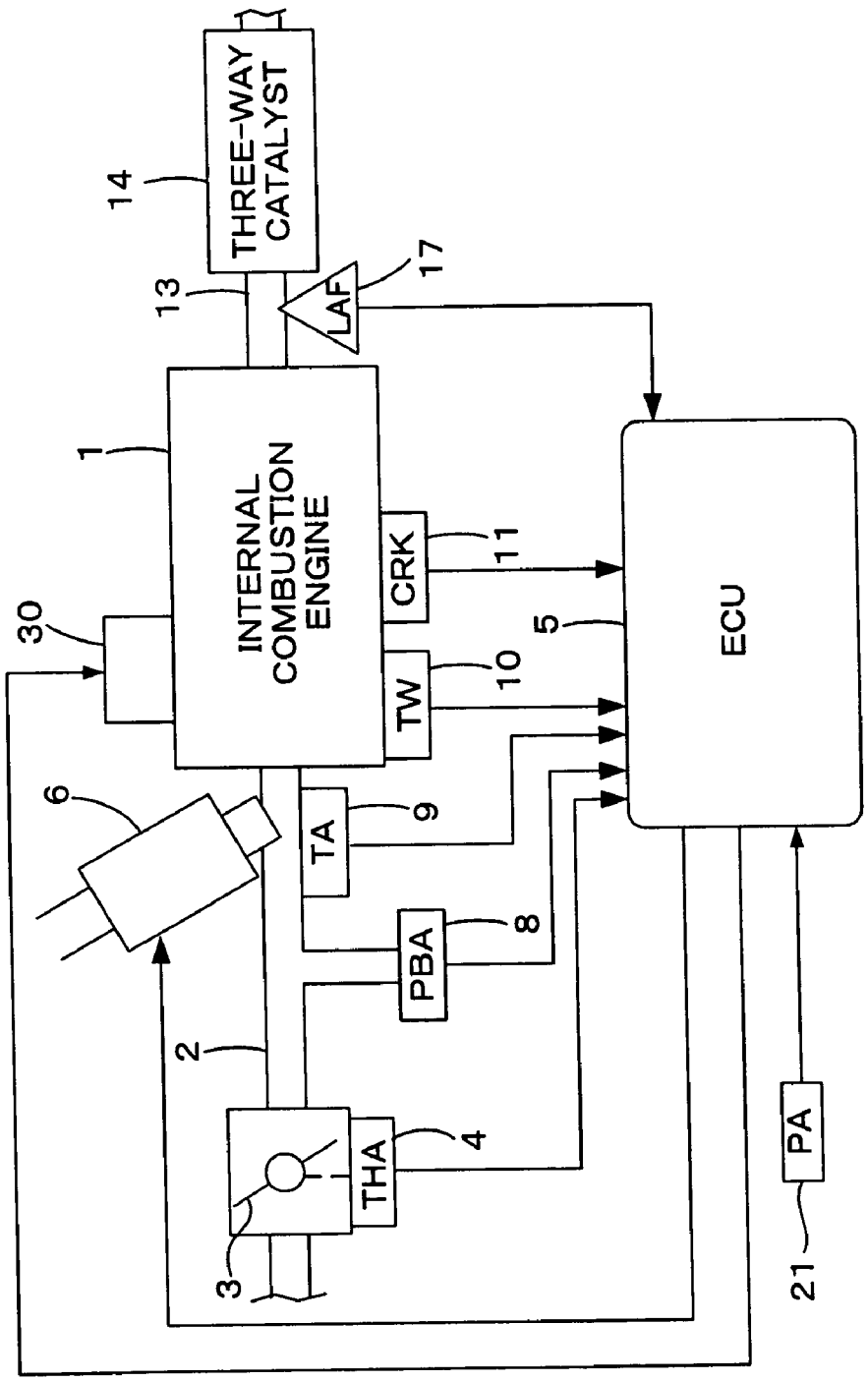
FIG. 1 is a schematic diagram showing a configuration of an internal combustion engine and a control apparatus therefor according to a first embodiment of the present invention.

FIG. 1 is a block diagram showing a configuration of a control apparatus for a plant, that is, an air-fuel ratio control apparatus for an internal combustion engine (which will be hereinafter referred to as "engine") according to a first embodiment of the present invention.

The engine 1 is a six-cylinder engine, having an intake pipe 2 provided with a throttle valve 3. A throttle opening (THA) sensor 4 is connected to the throttle valve 3, so as to output an electrical signal corresponding to a throttle valve opening THA of the throttle valve 3, and supply the electrical signal to an electronic control unit (which will be hereinafter referred to as "ECU") 5.

A fuel injection valve 6 is inserted into the intake pipe 2 at a position between the engine 1 and the throttle valve 3 and slightly upstream of an intake valve (not shown) of each cylinder. These fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal converted to an electrical signal by the absolute intake pressure sensor 8 is supplied to the ECU 5. An intake air temperature (TA) sensor 9 is provided downstream of the absolute intake pressure sensor 8 to detect an intake air temperature TA. An electrical signal corresponding to the detected intake air temperature TA is output from the sensor 9 and supplied to the ECU 5.

An engine coolant temperature (TW) sensor 10 such as a thermistor is mounted on the body of the engine 1 to detect an engine coolant temperature (cooling water temperature) TW. A temperature signal corresponding to the detected engine coolant temperature TW is output from the engine coolant temperature sensor 10 and supplied to the ECU 5.

A crank angle position sensor 11 for detecting a rotational angle of a crankshaft (not shown) of the engine 1 is connected to the ECU 5, and a signal corresponding to the detected rotational angle of the crankshaft is supplied to the ECU 5. The crank angle position sensor 11 includes a cylinder discrimination sensor to output a pulse at a predetermined crank angle position for a specific cylinder of the engine 1 (this pulse will be hereinafter referred to as a "CYL pulse"). The crank angle position sensor 11 also includes a top dead center (TDC) sensor to output a TDC pulse at a crank angle position before TDC by a predetermined crank angle starting at an intake stroke in each cylinder (at every 120 deg crank angle in the case of a six-cylinder engine), and a CRK sensor for generating one pulse with a constant crank angle period (e.g., a period of 30 deg) shorter than the period of generation of the TDC signal pulse (this pulse will be hereinafter referred to as "CRK pulse"). The CYL pulse, the TDC pulse, and the CRK pulse are supplied to the ECU 5. These pulses are used to control the various timings, such as fuel injection timing and ignition timing, and for detection of an engine rotational speed NE.

An exhaust pipe 13 of the engine 1 is provided with an air-fuel ratio sensor (which will be hereinafter referred to as "LAF sensor") 17, to output an electrical signal substantially proportional to the oxygen concentration in exhaust gases (the air-fuel ratio of an air-fuel mixture supplied to the engine 1). A three-way catalyst 14 is provided downstream of the LAF sensor 17. The three-way catalysts 14 reduces HC, CO, and NOx contained in the exhaust gases.

The LAF sensor 17 is connected to the ECU 5 to provide the ECU 5 with an electrical signal substantially proportional to the oxygen concentration in the exhaust gases.

The engine 1 has a valve timing switching mechanism 30 capable of switching the valve timing of intake valves and exhaust valves between a high-speed valve timing suitable for a high-speed rotational region of the engine 1, and a low-speed valve timing suitable for a low-speed rotational region of the engine 1. This switching of the valve timing also includes switching of a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of a type that the switching of the valve timing is carried out hydraulically. That is, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to an operating condition of the engine 1.

Although not shown, an exhaust recirculation mechanism and an evaporative fuel processing device are provided. The exhaust recirculation mechanism recirculates exhaust gases to the intake pipe 2. The evaporative fuel processing device has a canister for storing an evaporative fuel generated in a fuel tank to supply the evaporative fuel to the intake pipe 2 at an appropriate time.

An atmospheric pressure sensor 21 for detecting an atmospheric pressure (PA) is connected to the ECU 5 to supply a detection signal to the ECU 5.

The ECU 5 includes an input circuit, a central processing unit (CPU), a memory circuit, and an output circuit. The input circuit has various functions such as a function of shaping the waveforms of input signals from the various sensors, a function of correcting the voltage levels of the input signals to a predetermined level, and a function of converting analog signal values into digital signal values. The memory circuit includes a ROM (Read Only Memory) preliminarily storing various operational programs to be executed by the CPU and also storing various maps, and a RAM (Random Access Memory) for storing the results of computation or the like by the CPU. The output circuit supplies drive signals to various solenoid valves including the fuel injection valves 6 and the spark plugs of the engine 1.

The ECU 5 determines various engine operating regions such as a feedback control operating region and an open loop control operating region, based on the detected signals from the above-described various sensors. The ECU 5 calculates a required fuel amount TCYL from Eq. (1) shown below. The required fuel amount TCYL is a fuel amount required for a combustion per cycle in each cylinder:

$$TCYL = TIM \times KTOTAL \times KSTR \quad (1)$$

TIM is a basic fuel amount which is determined by retrieving a TI map set according to the engine rotational speed NE and the absolute intake pressure PBA. The TI map is set so that the air-fuel ratio of an air-fuel mixture to be supplied to the engine substantially becomes the stoichiometric ratio in the operating condition corresponding to the engine rotational speed NE and the absolute intake pressure PBA. Accordingly, the basic fuel amount TIM is substantially proportional to an intake air flow rate (mass flow rate) of the engine per a unit time (1 TDC period: a time period between the adjacent two TDC pulses).

KTOTAL is a correction coefficient which is obtained by multiplying all of the correction coefficients, such as an engine coolant temperature correction coefficient KTW set according to the engine coolant temperature, an intake air temperature correction coefficient KTA set according to the intake air temperature TA, an atmospheric pressure correction coefficient KPA set according to the atmospheric pressure PA, an EGR correction coefficient KEGR set according to an exhaust gas recirculation amount during execution of the exhaust gas recirculation, a purge correction coefficient KPUG set according to an amount of the purged fuel during execution of the evaporative fuel purging by the evaporative fuel processing device.

KSTR is a self-tuning correction coefficient calculated according to a detected equivalent ratio KACT and a target equivalent ratio KCMD by a self-tuning regulator described below.

The ECU 5 further executes an adhesion correcting operation which takes into account that the fuel injected from each fuel injection valve 6 into the intake pipe partially adheres to the inner wall of the intake pipe, to calculate a fuel injection period TOUT of each fuel injection valve 6. The adhesion correction is disclosed in detail, for example, in Japanese Patent Laid-open No. 8-21273. The fuel injection valve 6 injects fuel into the intake pipe 2. An amount of injected fuel is proportional to the fuel injection period TOUT.

Figure 2:
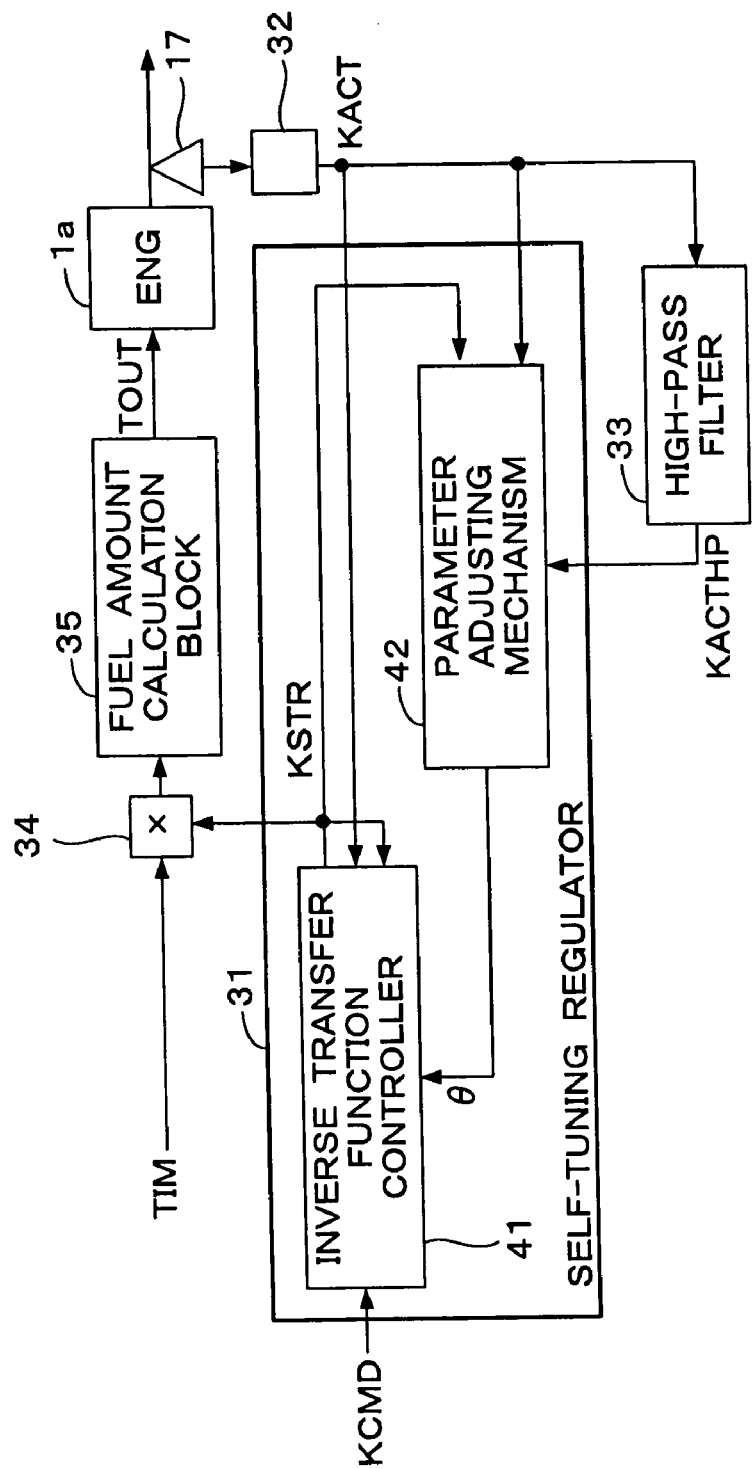
FIG. 2 is a block diagram showing the configuration of a control system including the internal combustion engine shown in FIG. 1.

FIG. 2 is a function block diagram showing an essential portion of the control system to illustrate the control by the self-tuning regulator. The control system shown in FIG. 2 consists of a self-tuning regulator 31, a conversion block 32, a high-pass filter 33, a multiplier 34, a fuel amount calculating block 35, an engine system 1a, and the LAF sensor 17. The engine system 1a includes the fuel injection valve 6, the intake pipe 2, the engine 1, and the exhaust pipe 13. The self-tuning regulator 31, the conversion block 32, the high-pass filter 33, the multiplier 34, and the fuel amount calculating block 35 are functional blocks realized by the ECU 5.

The conversion block 32 converts an output of the LAF sensor to the detected equivalent ratio KACT. The high-pass filter 33 performs high-pass filtering of the detected equivalent ratio KACT. The self-tuning regulator 31 includes an inverse transfer function controller 41 and a parameter adjusting mechanism 42. The parameter adjusting mechanism calculates a model parameter vector θ based on the detected equivalent ratio KACT, the self-tuning correction coefficient KSTR, and the high-pass filtered detected equivalent ratio KACTHP (hereinafter referred to as "filtered equivalent ratio KACTHP"). The model parameter vector θ is a vector having elements of a plurality of model parameters defining a controlled object model described below. The inverse transfer function controller 41 calculates the self-tuning correction coefficient KSTR according to the inverse transfer function of the transfer function of the controlled object model, based on the target equivalent ratio KCMD, the detected equivalent ratio KACT, and past values of the self-tuning correction coefficient KSTR, using the model parameter vector θ.

The multiplier 34 multiplies the self-tuning correction coefficient KSTR by the basic fuel amount TIM. The fuel amount calculating block 35 performs calculations of the correction coefficient KTOTAL in the equation (1) and the required fuel amount TCYL, and the adhesion correcting operation, to thereby calculate the fuel injection period TOUT.

The self-tuning regulator 31 calculates the self-tuning correction coefficient KSTR based on the controlled object model that is obtained by modeling the engine system 1a which is a controlled object. The controlled object model is defined as a DARX model (delayed autoregressive model with exogeneous input model) having a dead time of 3 control cycles, by Eq (2) shown below.

$$KACT(k)=b0 \times KSTR(k-3)+r1 \times KSTR(k-4)+r2 \times KSTR(k-5)+r3 \times KSTR(k-6)+s0 \times KACT(k-3) \quad (2)$$

where b0, r1, r2, r3, and s0 are the model parameters identified by the parameter adjusting mechanism 42, and k indicates a control time (sampling time) corresponding to the combustion cycle in a specific cylinder.

Assuming that a model parameter vector θ(k) having the model parameters as elements is defined by Eq. (3) shown below, the model parameter vector θ(k) is calculated from Eqs. (4) and (5) shown below.

$$\theta(k)^T = [b0, r1, r2, r3, s0] \quad (3)$$

$$\theta(k) = SGM\theta(k-1) + KID \cdot d\theta(k) \quad (4)$$

$$d\theta(k) = KP(k)ide(k) \quad (5)$$

SGM in Eq. (4) is a forgetting coefficient matrix defined by Eq (6) shown below. σ in Eq. (6) is a forgetting coefficient set to a value between "0" and "1". KID is a spike correction coefficient which is set according to the filtered equivalent ratio KACTHP, and corrects an updating vector dθ(k) in a decreasing direction when a spiky change in the detected equivalent ratio KACT is detected. dθ(k) is an updating vector of the model parameter vector θ(k). KP(k) in Eq. (5) is a gain coefficient vector defined by Eq (7) shown below. P(k) in Eq. (7) is a fifth-order square matrix defined by Eq. (8) shown below, and ide(k) is an identification error defined by Eq. (9) shown below. In Eq. (9), KACTHAT(k) is an estimated equivalent ratio calculated from Eq. (10), using a latest (preceding) model parameter vector θ(k−1).

$$SGM = \begin{bmatrix} 1 & 0 & 0 & 0 & 0 \\ 0 & \sigma & 0 & 0 & 0 \\ 0 & 0 & \sigma & 0 & 0 \\ 0 & 0 & 0 & \sigma & 0 \\ 0 & 0 & 0 & 0 & \sigma \end{bmatrix} \quad (6)$$

$$KP(k) = \frac{P(k)\zeta(k)}{1+\zeta^T(k)P(k)\zeta(k)} \quad (7)$$

$$P(k+1) = \frac{1}{\lambda_1}\left(E - \frac{\lambda_2(K)\zeta(k)\zeta^T(k)}{\lambda_1+\lambda_2\zeta^T(k)P(k)\zeta(k)}\right)P(k) \quad (8)$$

(E: the unit matrix)

$$ide(k) = KACT(k) - KACTHAT(k) \quad (9)$$

$$KACTHAT(k) = \theta(k-1)^T\zeta(k) \quad (10)$$

In Eqs. (7), (8), and (10), ζ(k) is the vector defined by Eq. (11) shown below and having the control output (KACT) and the control input (KSTR×KTH) as elements.

$$\zeta(k)^T = [KSTR(k-3), KSTR(k-4), KSTR(k-5), KSTR(k-6), KACT(k-3)] \quad (11)$$

According to settings of the coefficients λ1 and λ2 in Eq. (8), the identification algorithm by Eqs. (4) to (11) is classified into the following four identification algorithms.

For λ1=1 and λ2=0, fixed gain algorithm

For λ1=1 and λ2=1, least square method algorithm

For λ1=1 and λ2=λ, decreasing gain algorithm (λ takes any predetermined values other than "0" and "1")

For λ1=λ and λ2=1, weighted least square method algorithm (λ takes any predetermined values other than "0" and "1")

In this embodiment, the fixed gain algorithm is employed with the setting of λ1=1 and λ2=0. Alternatively, another setting can be employed. When employing the fixed gain algorithm, the square matrix P(k) has constant values as diagonal elements.

As described above, the parameter adjusting mechanism 42 multiplies the forgetting coefficient matrix SGM by a preceding value θ(k−1) of the model parameter vector, and add the result of this multiplication and the corrected updating vector (KID·dθ(k)) which is corrected with the spike correction coefficient KID, to thereby calculate a present value θ(k) of the model parameter vector. The forgetting coefficient matrix SGM is employed in order to reduce influence of the past values of the identification error ide and prevent a drift of the model parameter vector. If the drift of the model parameter vector is not likely to occur, the model parameter vector θ(k) may be calculated with the following Eq. (4a) which does not include the forgetting coefficient matrix SGM.

$$\theta(k)=\theta(k-1)+KID \cdot d\theta(k) \quad (4a)$$

The inverse transfer function controller 41 determines the self-tuning correction coefficient KSTR(k), which is the control input, so as to satisfy the following Eq. (12).

$$KCMD(k)=KACT(k+3) \quad (12)$$

By using Eq. (1), the right side of Eq. (12) is expressed by the following equation.

$$KACT(k+3)=b0 \times KSTR(k)+r1 \times KSTR(k-1)+r2 \times KSTR(k-2)+r3 \times KSTR(k-3)+s0 \times KACT(k)$$

Accordingly, Eq. (13) shown below is obtained by calculating the self-tuning correction coefficient KSTR(k) using the above equation.

$$KSTR(k)=(1/b0)(KCMD(k)-r1 \times KSTR(k-1)-r2 \times KSTR(k-2)-r3 \times KSTR(k-3)-s0 \times KACT(k)) \quad (13)$$

Thus, the inverse transfer function controller 41 calculates the self-tuning correction coefficient KSTR(k) with Eq. (13).

The high-pass filter 33 performs the high-pass filtering by Eq. (15) shown below.

$$KACTHP(k)=h20 \times KACT(k)+h21 \times KACT(k-1)+h22 \times KACT(k-2)-h11 \times KACTHP(k-1)-h12 \times KACTHP(k-2) \quad (15)$$

The filter coefficients h11, h12, h20, h21, and h22 are determined by experiments. The characteristic of the high-pass filtering is determined by the setting of these filter coefficients. In this embodiment, the characteristic of the high-pass filtering is changed according to the engine operating condition as hereinafter described.

Figure 3A:
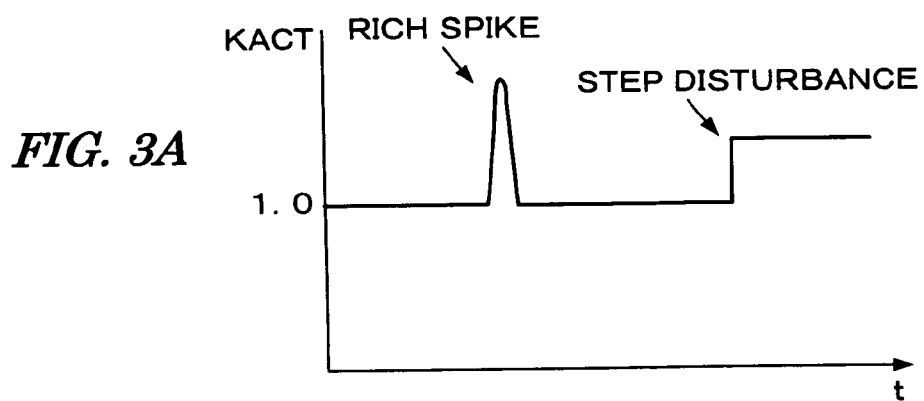
FIGS. 3A–3C are time-charts illustrating a method for setting a spike correction coefficient (KID)
Figure 3B:
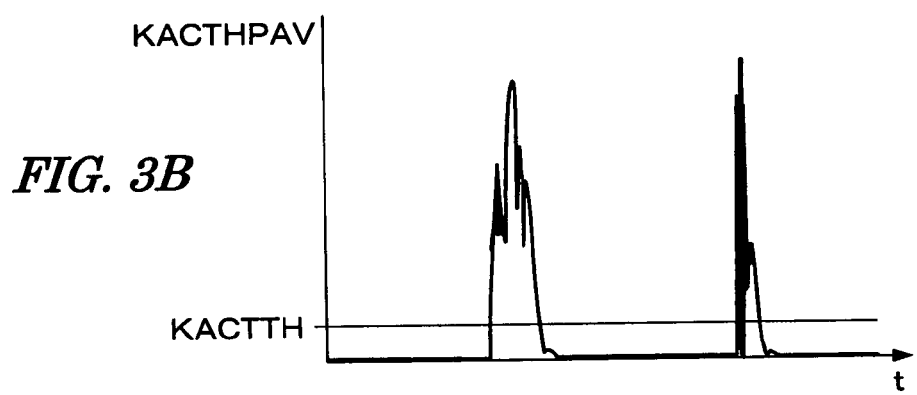
Figure 3C:
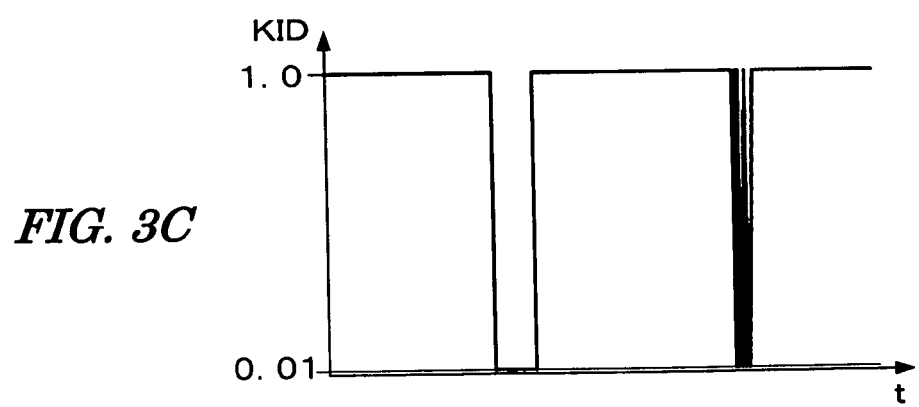

FIGS. 3A to 3C are time charts for illustrating the setting of the spike correction coefficient KID in the parameter adjusting mechanism 42. FIG. 3A shows changes in the detected equivalent ratio KACT, specifically a spiky change in the rich direction (a rich spike) and a step-wise disturbance (hereinafter referred to as "step disturbance"). FIG. 3B shows changes in the average value KACTHPAV of the absolute value of the filtered equivalent ratio KACTHP. The average value KACTHPAV increases corresponding to the rich spike of the detected equivalent ratio KACT and the step disturbance. The change corresponding to the rich spike is greater than the change corresponding to the step disturbance. FIG. 3C shows changes in the spike correction coefficient KID. In the illustrated example of FIG. 3C, when the average value KACTHPAV exceeds a predetermined threshold value KACTTH, it is determined that the detected equivalent ratio KACT has indicated a spiky change (a spiky response has been output), so that the spike correction coefficient KID is set to "0.01", otherwise the spike correction coefficient KID is set to "1.0". Alternatively, the spike correction coefficient KID may be set to "0", when the average value KACTHPAV of the absolute value of the filtered equivalent ratio KACTHP exceeds the predetermined threshold value KACTTH. In such case, the corrected updating vector KID·dθ becomes "0", which may make the parameter adjusting mechanism 42 become likely to malfunction. Therefore, it is preferable to set the spike correction coefficient KID to a value which is slightly greater than "0".

Figure 4A:
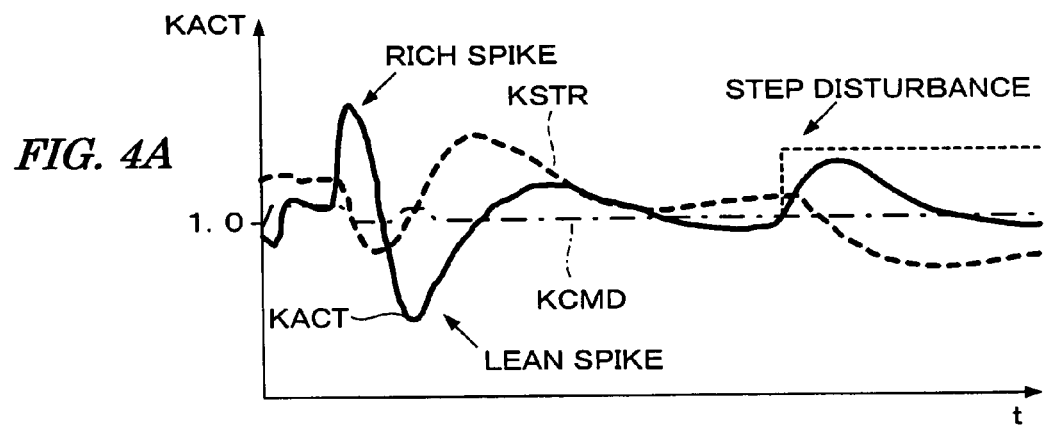
FIGS. 4A and 4B are time charts illustrating advantage of the present invention.
Figure 4B:
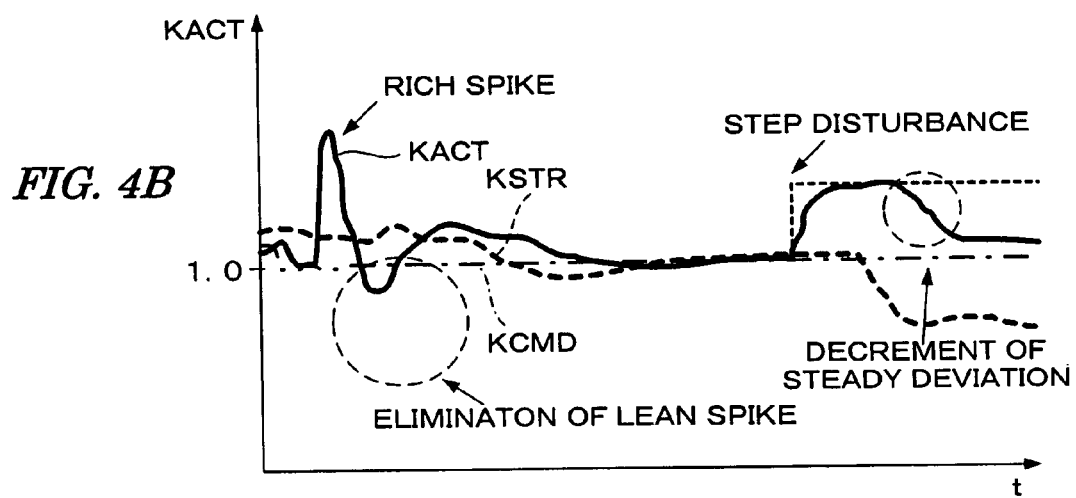

FIG. 4A is a time chart that shows changes in the detected equivalent ratio KACT when a conventional self-tuning regulator which does not use the spike correction coefficient KID performs the control. FIG. 4B is a time chart that shows changes in the detected equivalent ratio KACT when the self-tuning regulator of the present embodiment which uses the spike correction coefficient KID performs the control. FIGS. 4A and 4B also show changes in the self-tuning correction coefficient KSTR and the target equivalent ratio KCMD for reference.

In FIG. 4A, a lean spike is generated immediately after the rich spike of the detected equivalent ratio KACT, while in FIG. 4B, the self-tuning correction coefficient KSTR does not greatly decrease corresponding to the rich spike of the detected equivalent ratio KACT, and the lean spike is not generated. In this embodiment, when the spiky response output is detected, the spike correction coefficient KID is changed to a smaller value, to reduce the updating rate of the model parameters. This makes it possible to avoid excessive correction by the self-tuning regulator for the spiky response output and to maintain good controllability.

Further, it is shown in these drawings that, as for the step disturbance, a steady-deviation decreasing characteristic that is almost the same as that of the conventional control, can be obtained by the control of the self-tuning regulator in this embodiment. This is because the time period during which the average value KACTHPAV of the absolute value of the filtered equivalent ratio KACTHP exceeds the predetermined threshold value KACTTH is short as shown in FIG. 3C, and the control delay does not become so large, when the step disturbance is applied.

The calculation processes executed by the CPU of the ECU 5, which realize the function of the self-tuning regulator 31 described above, will be described below with reference to FIGS. 5 to 9.

Figure 5:
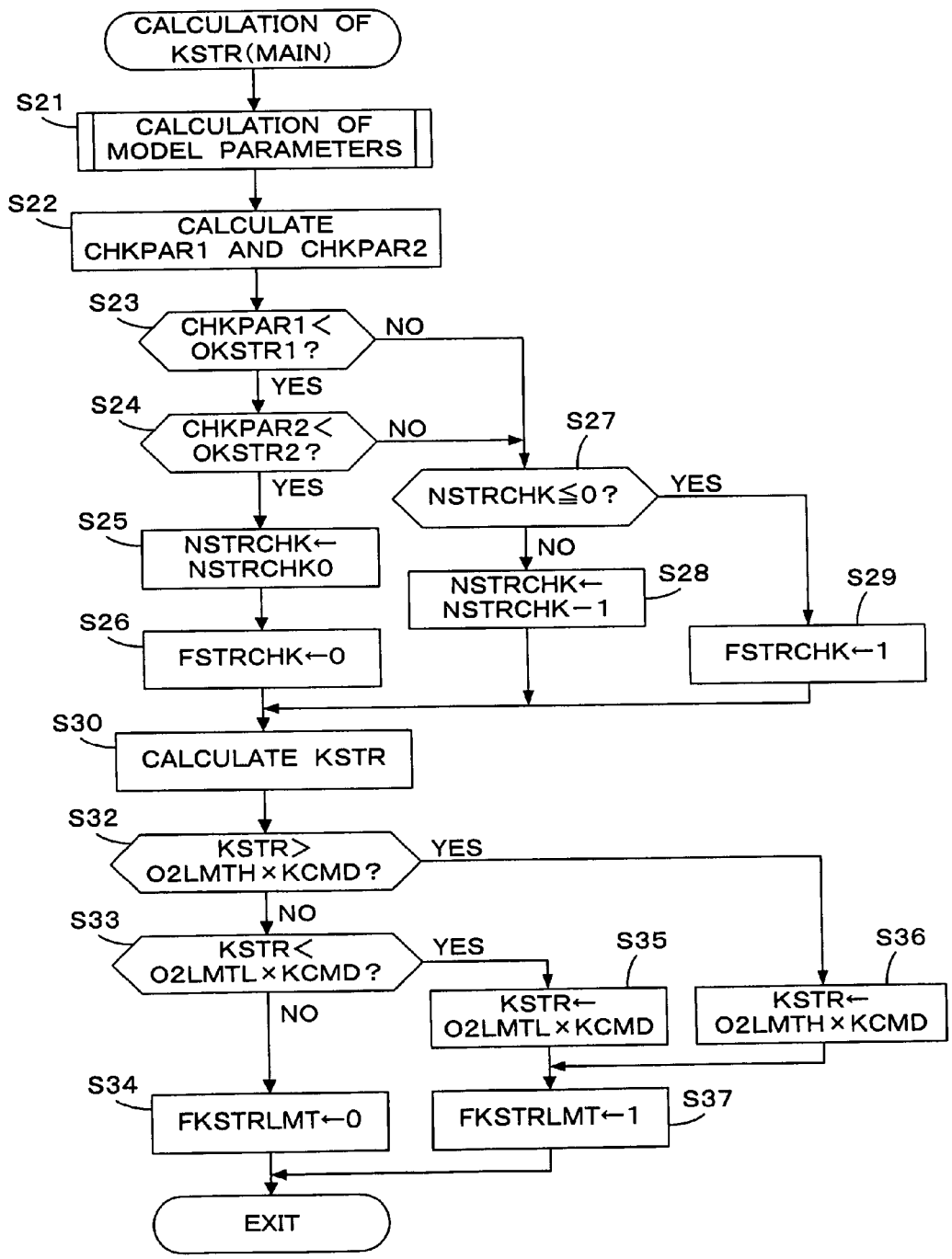
FIG. 5 is a flowchart showing a process of calculating a self-tuning regulator (KSTR)

FIG. 5 is a flowchart showing a process for calculating the self-tuning correction coefficient KSTR. This process is executed in synchronism with generation of the TDC pulse (at intervals of 240 deg crank angle).

Figure 6:
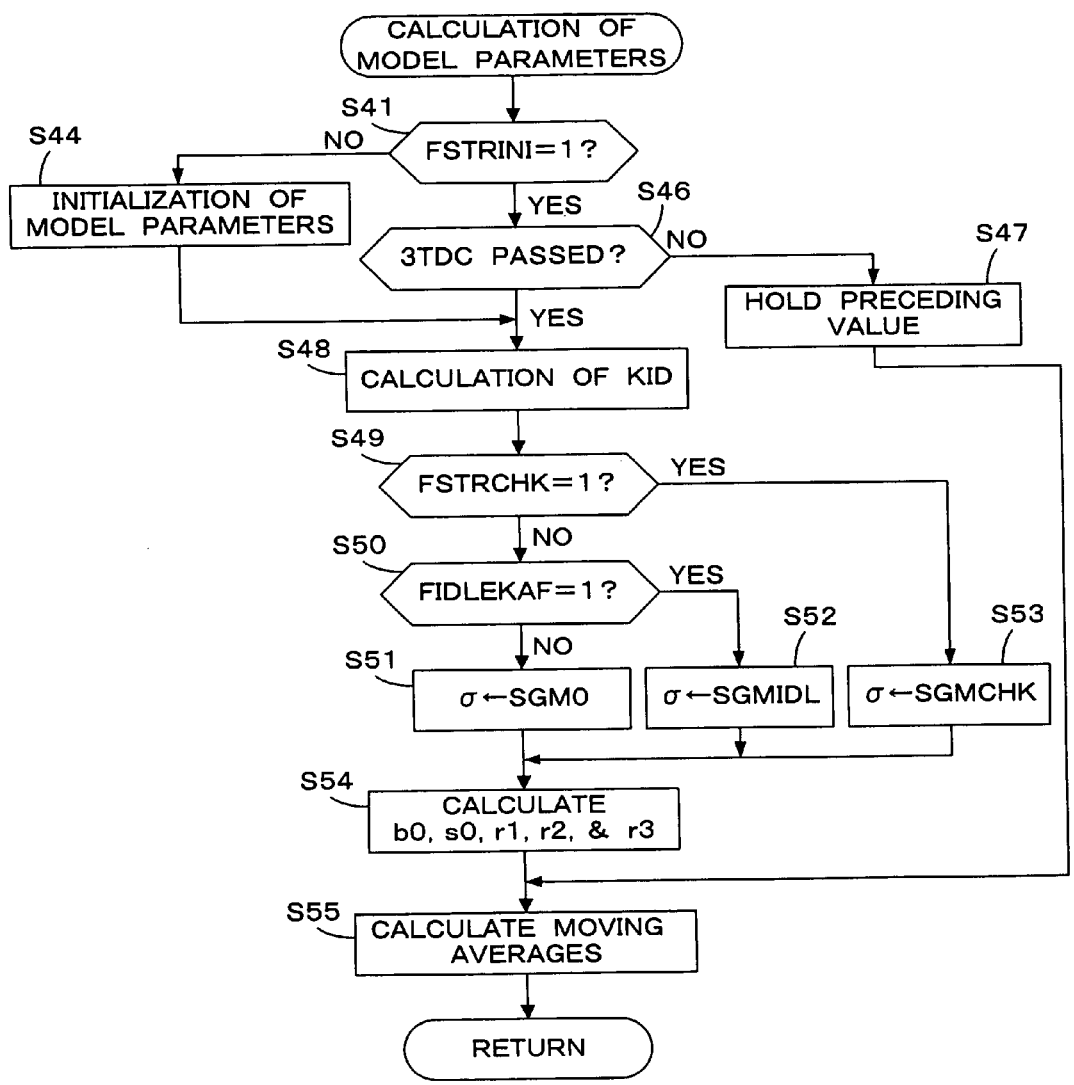
FIG. 6 is a flowchart showing a process of calculating model parameters.

In step S21, a model parameter calculation process shown in FIG. 6 is executed. In the process shown in FIG. 6, the model parameters b0, s0, and r1 to r3 are calculated, and moving averages b0 AV, s0AV, r1AV, r2AV, and r3AV of these parameters are also calculated. In step S22, the moving averages b0AV, s0AV, r1AV, r2AV, and r3AV are applied to Eqs. (21) and (22) shown below to calculate first and second stability determination parameters CHKPAR1 and CHKPAR2.

$$CHKPAR1=(r1AV-r2AV+r3AV+s0AV)/b0AV \quad (21)$$

$$CHKPAR2=|r1AV|+|r2AV|+|r3AV| \quad (22)$$

In step S23, it is determined whether or not the first stability determination parameter CHKPAR1 is less than a first determination threshold OKSTR1 (e.g., 0.6). If CHKPAR1 is less than OKSTR1, it is further determined whether or not the second stability determination parameter CHKPAR2 is less than a second determination threshold OKSTR2 (e.g., 0.4) (step S24). If both of the answers to steps S23 and S24 are affirmative (YES), it is determined that the model parameters are stable, and a downcounter NSTRCHK is set to a predetermined value NSTRSHK0 (e.g., 4) (step S25). Further, a stability determination flag FSTRCHK is set to "0" (step S26). The stability determination flag FSTRCHK indicates that the model parameters are stable when it is set to "0".

If the answer to step S23 or S24 is negative (NO), it is determined whether or not the value of the downcounter NSTRCHK is less than or equal to "0" (step S27). Initially, NSTRCHK is greater than "0", so that the value of the downcounter NSTRCHK is decremented by "1" (step S28). Thereafter, the process proceeds to step S30. When the value of the downcounter NSTRCHK becomes "0", the process proceeds from step S27 to step S29, in which the stability determination flag FSTRCHK is set to "1" (step S29).

In step S30, the self-tuning correction coefficient KSTR is calculated from Eq. (13a) shown below. Eq. (13a) is obtained by replacing the model parameters b0, r1, r2, r3, and s0 with the moving averages b0AV, r1AV, r2AV, r3AV, and s0AV, and further replacing the control time (sampling time) "k" with a control time (sampling time) "n". The control time "k" is a control time corresponding to a combustion cycle (720 deg crank angle) of a specific cylinder, and the control time "n" is a control time corresponding to a TDC period (240 deg crank angle in this embodiment). Accordingly, the relation of "n=3k" is satified.

$$KSTR(n)=(1/b0)(KCMD(n)-r1AV\times KSTR(n-3)-r2AV\times KSTR(n-6)-r3AV\times KSTR(n-9)-s0AV\times KACT(n)) \quad (13a)$$

In steps S32 to S37, a limit process of the self-tuning correction coefficient KSTR is executed. More specifically, if the self-tuning correction coefficient KSTR is greater than an upper limit (O2LMTH×KCMD) obtained by multiplying the target equivalent ratio KCMD by an upper limit coefficient O2LMTH (e.g., 1.2), the self-tuning correction coefficient KSTR is set to the upper limit (O2LMTH×KCMD) (steps S32 and S36). If the self-tuning correction coefficient KSTR is less than a lower limit (O2LMTL×KCMD) obtained by multiplying the target equivalent ratio KCMD by a lower limit coefficient O2LMTL (e.g., 0.5), the self-tuning correction coefficient KSTR is set to the lower limit (O2LMTL×KCMD) (steps S33 and S35). In these cases, a limit flag FKSTRLMT is set to "1", so as to indicate that the self-tuning correction coefficient KSTR has been set to the upper limit or the lower limit (step S37). If the self-tuning correction coefficient KSTR falls between the upper limit and the lower limit, the limit flag FKSTRLMT is set to "0" (step S34).

FIG. 6 is a flowchart showing the model parameter calculation process executed in step S21 shown in FIG. 5.

In step S41, it is determined whether or not a initialization end flag FSTRINI is "1". The initialization end flag FSTRINI is set to "1" when the initialization of the model parameters is completed, and returned to "0" when the initialization of the model parameter is necessary, e.g., when the engine is stopped.

If FSTRINI is equal to "0" in step S41, the initialization of the model parameters is performed. Specifically, the latest value and past values of the model parameter b0 are all set to "1.0", and the moving average b0AV is set to "1.0". Further, the latest values and past values of the other model parameters r1 to r3 and s0 are all set to "0", and the corresponding moving averages r1AV, r2AV, r3AV, and s0AV are all set to "0". After ending this initialization of the parameters, the process proceeds to step S48.

If FSTRINI is equal to "1" in step S41, it is determined whether or not 3 TDC periods (a time period equivalent to three periods of the TDC signal pulse, i.e., one combustion cycle in this embodiment) have elapsed from the time of the preceding calculation of the model parameters (step S46). The model defined by Eq. (2) and the control input calculated from Eqs. (3) to (15) are defined with a control time (sampling time) "k" which is in synchronism with a combustion cycle k of a specific cylinder. Therefore, in this embodiment, the calculation of the model parameter vector θ, i.e., the model parameters b0, s0, and r1 to r3, is performed once every 3 TDC periods in synchronism with a combustion cycle of a specific cylinder. Accordingly, if the answer to step S46 is affirmative (YES), the calculation of the model parameters b0, s0, and r1 to r3 is performed in steps S48 and S49. If the answer to step S46 is negative (NO), the model parameter vector θ holds the preceding value (step S47), i.e., the model parameters b0(n), s0(n), and r1(n) to r3(n) are set to the preceding values b0(n-1), s0(n-1), and r1(n-1) to r3(n-1), respectively. Thereafter, the process proceeds to step S55.

Figure 7:
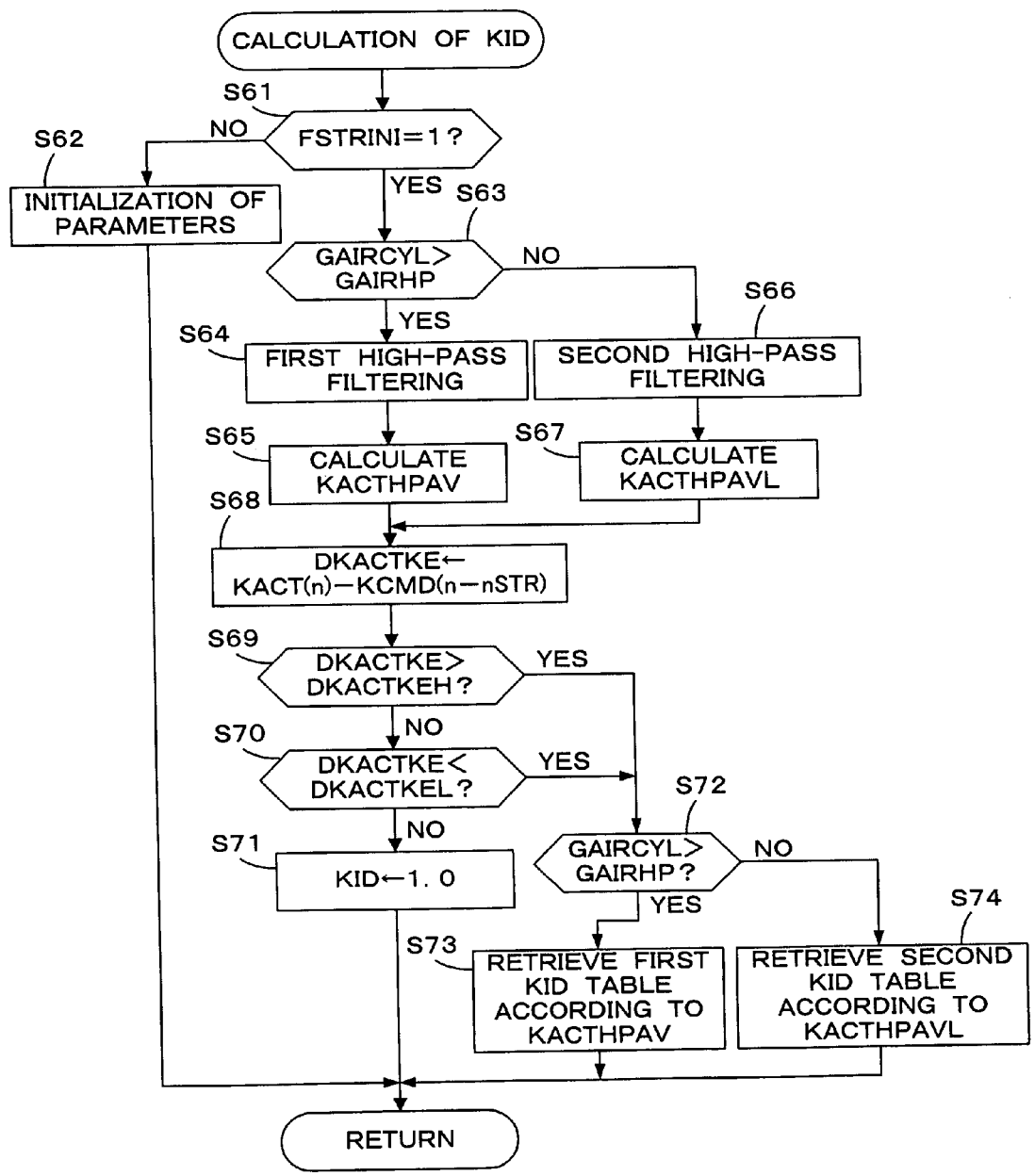
FIG. 7 is a flowchart showing a process of calculating the spike correction coefficient (KID)

In step S48, a KID calculation process shown in FIG. 7 is executed, to calculate the spike correction coefficient KID.

In step S49, it is determined whether or not the stability determination flag FSTRCHK is "1". If FSTRCHK is equal to "1", which indicates that the model parameters are determined to be unstable, the forgetting coefficient σ is set to a predetermined value SGMCHK for an unstable condition (step S53).

If the answer to step S49 is negative (NO), i.e., the model parameters are stable, it is determined whether or not an idle flag FIDLEKAF is "1" (step S50). The idle flag FIDLEKAF is set to "1" when the engine rotational speed NE is lower than a predetermined low rotational speed NEIDL and the throttle valve opening THA is less than a predetermined small opening THIDL. If the idle flag FIDLEKAF is "1" in step S50, the forgetting coefficient σ is set to a predetermined value SGMIDL for the idling condition (step S52). If the idle flag FIDLEKAF is "0" in step S50, the forgetting coefficient u is set to a predetermined value SGM0 for a normal condition (step S51). The predetermined values SGM0, SGMIDL, and SGMCHK are set so that the relation "SGM0>SGMIDL>SGMCHK" is satisfied. In an unstable condition, the forgetting coefficient σ is changed to a smaller value, to thereby reduce influence of the past values of the model parameters and make the model parameters readily return to a stable condition.

In step S54, the model parameter vector, i.e., the model parameters b0, s0, and r1–r3 are calculated by Eqs. (4b), (5a), (7a), (9a), (10a), and (11a) shown below (step S48). These equations are obtained by replacing the control time "k" in Eqs. (4), (5), (7), (9), (10), and (11) with the control time "n". Eq. (7a) is simplified by employing the fixed algorithm. That is, the matrix P is a diagonal matrix having constants as diagonal elements.

$$\theta(n)=SGM\theta(n-3)+KID\cdot d\theta(n) \quad (4b)$$

$$d\theta(n)=KP(n)ide(n) \quad (5a)$$

$$KP(n) = \frac{P\zeta(n)}{1+\zeta^T(n)P\zeta(n)} \quad (7a)$$

$$ide(n)=KACT(n)-KACTHAT(n) \quad (9a)$$

$$KACTHAT(n)=\theta(n-1)^T\zeta(n) \quad (10a)$$

$$\zeta(n)^T=[KSTR(n-9), KSTR(n-12), KSTR(n-15), KSTR(n-18), KACT(n-9)] \quad (11a)$$

In step S55, the moving averages b0AV, s0AV, r1AV, r2AV, and r3AV are calculated from Eqs. (25)–(29) shown below.

$$b0AV = \sum_{i=0}^{11} b0(n-i)/12 \qquad (25)$$

$$s0AV = \sum_{i=0}^{11} s0(n-i)/12 \qquad (26)$$

$$r1AV = \sum_{i=0}^{11} r1(n-i)/12 \qquad (27)$$

$$r2AV = \sum_{i=0}^{11} r2(n-i)/12 \qquad (28)$$

$$r3AV = \sum_{i=0}^{11} r3(n-i)/12 \qquad (29)$$

By using the model parameters b0AV, s0AV, r1AV, r2AV, and r3AV obtained by the moving averaging calculation to calculate the self-tuning correction coefficient KSTR, unstable behavior of the self-tuning regulator due to updating the model parameter vector once every 3 TDC periods, and further due to the low-pass characteristic of the LAF sensor 17, can be prevented.

FIG. 7 is a flowchart showing KID calculation process executed in step S48 of FIG. 6.

In step S61, it is determined whether or not the initialization end flag FSTRINI is "1". If FSTRINI is equal to "0", initialization of various parameters is performed (step S62). Specifically, all of the past values of the detected equivalent ratio KACT stored in the memory are set to the present value KACT(n), and all of the past values of the filtered equivalent ratio KACTHP stored in the memory are set to "0". Further, all of the past values of the target equivalent ratio KCMD stored in the memory are set to the present value KACT(n) of the detected equivalent ratio, and the spike correction coefficient KID is set to "1.0".

If FSTRINI is equal to "1" in step S62, it is determined whether or not an intake air flow rate GAIRCYL is greater than a predetermined intake air flow rate GAIRHP (e.g., 0.5 g per 1 TDC period). In this embodiment, an intake air flow rate sensor is not used. Therefore, the intake air flow rate GAIRCYL is calculated by multiplying the basic fuel amount TIM applied to Eq. (1) by a conversion coefficient.

If GAIRCYL is greater than GAIRHP in step S63, i.e., the engine 1 is operating in a high load operating condition, a first high-pass filtering is performed by Eq. (15a) shown below, to calculate a first filtered equivalent ratio KACTHP (n) (step S64). Eq. (15a) is obtained by replacing the control time "k" in Eq. (15) with the control time "n".

$$KACTHP(n)=h20 \times KACT(n)+h21 \times KACT(n-3)+h22 \times \\ KACT(n-6)-h11 \times KACTHP(n-3)-h12 \times KACTHP \\ (n-6) \qquad (15a)$$

Next, a first average value KACTHPAV is calculated from Eq. (30) shown below (step S65).

$$KACTHPAV=(|KACTHP(n)|+|KACTHP(n-nHPD1)|)/2 \qquad (30)$$

The reason for calculating the average value KACTHPAV of the filtered equivalent ratio KACTHP is described below referring to FIGS. 8A–8C. FIG. 8A shows a spiky response wave form, and FIG. 8B shows a high-pass filtered spiky response wave form. The amplitude of the high-pass filtered wave form becomes "0" at time t0 when the amplitude of the spiky response wave form becomes a peak level. Therefore, there is a possibility that the spiky response may not accurately be detected if the filtered equivalent ratio KACTHP is used as itself. Accordingly, the first average value KACTHPAV of an absolute value of the filtered equivalent ratio KACTHP(n−nHPD1) which is a filtered equivalent ratio at the time a first discrete time nHPD1 before (the wave form shown in FIG. 8C by a broken line) and an absolute value of the present value KACTHP(n) (the wave form shown in FIG. 8C by a solid line), is calculated, and the occurrence of the spiky response is determined with the average value KACTHPAV.

If GAIRCYL is less than or equal to GAIRHP, i.e., the engine 1 is operating in a low load operating condition, a second high-pass filtering is performed by Eq. (15b) shown below, to calculate a second filtered equivalent ratio KACTHPL(n) (step S66). Eq. (15b) is obtained by changing the filter coefficients in Eq. (15a) so that the cut-off frequency of the second high-pass filtering is lower than that of the first high-pass filtering. There is a tendency where the frequency components of the spiky response become higher as the load on the engine 1 becomes greater. Accordingly, by lowering the cut-off frequency of the high-pass filtering in the low load operating condition compared with the high load operating condition, the spiky response can be detected more accurately.

$$KACTHPL(n)=h20L \times KACT(n)+h21L \times KACT(n-1)+ \\ h22L \times KACT(n-2)-h11L \times KACTHP(n-1)-h12L \times \\ KACTHP(n-2) \qquad (15b)$$

In step S67, a second average value KACTHPAVL, which is an average value of the present absolute value of the second high-pass filtered equivalent ratio KACTHPL and the absolute value of the second high-pass filtered equivalent ratio KACTHPL at the time a second discrete time nHPD2 before, is calculated from Eq. (31) shown below.

$$KACTHPAVL=(|KACTHPL(n)|+|KACTHPL(n- \\ nHPD2)|)/2 \qquad (31)$$

The first discrete time nHPD1 and the second discrete time nHPD2 are set according to delay time periods of the first and second high-pass filterings.

In step S68, a control deviation DKACTKE is calculated from Eq. (32).

$$DKACTKE=KACT(n)-KCMD(n-nSTR) \qquad (32)$$

where a discrete time nSTR corresponds a dead time period of the control system (a delay time period from the change in the target equivalent ratio KCMD to the change in the detected equivalent ratio KACT). In this embodiment, the discrete time nSTR is set to "9".

In step S69, it is determined whether or not the control deviation DKACTKE is greater than an upper threshold value DKACTKEH (e.g., "0.05"). If the control deviation DKACTKE is less than or equal to the upper threshold value DKACTKEH, it is further determined whether or not the control deviation DKACTKE is less than a lower threshold value DKACTKEL (e.g., "−0.05") (step S70). If the answer to step S70 is negative (NO), i.e., the control deviation is between the upper threshold value KDACTKEH and the lower threshold value DKACTKEL, it is determined that the spiky response is not generated, and the spike correction coefficient KID is set to "1.0" (step S71).

If the answer to step S69 or S70 is affirmative (YES), it is determined that there is a possibility that the rich spike shown in FIG. 9 may be generated or a possibility that the lean spike shown in FIG. 9 may be generated, and the process proceeds to step S72.

Figure 10A:
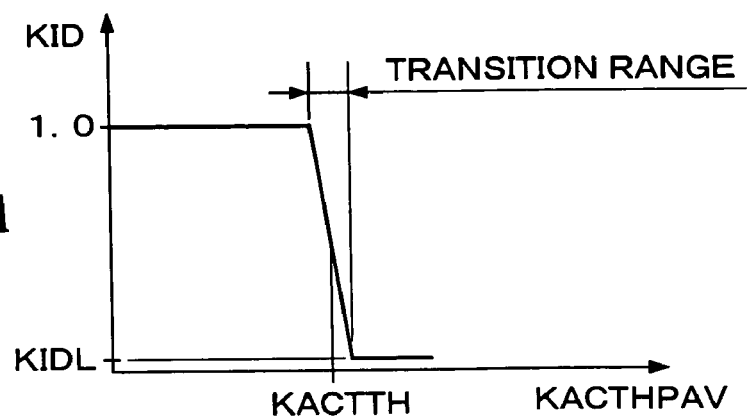
FIGS. 10A and 10B show tables which are referred to in the process shown in FIG. 7.

In step S72, it is determined whether or not the intake air flow rate GAIRCYL is greater than the predetermined intake air flow rate GAIRHP. If GAIRCYL is greater than GAIRHP, i.e., the engine is operating in the high load condition, a first KID table shown in FIG. 10A is retrieved according to the first average value KACTHPAV to calculate the spike correction coefficient KID (step S73). According to the first KID table, in the transition range in the vicinity of the first predetermined threshold value KACTTH, the spike correction coefficient KID is set so that it decreases as the first average value KACTHPAV increases. In the range where the first average value KACTHPAV is less than the transition range, the spike correction coefficient KID is set to "1.0", and in the range where the first average value KACTHPAV is greater than the transition range, the spike correction coefficient KID is set to a predetermined value KIDL (e.g., "0.01"). Even when it is determined in step S69 or S70 that there is a possibility that the rich spike or the lean spike may be generated, if the first average value KACTHPAV is less than the transition range, it is determined that the spiky response has not been output. Accordingly, the spike correction coefficient KID is set to "1.0".

Figure 10B:
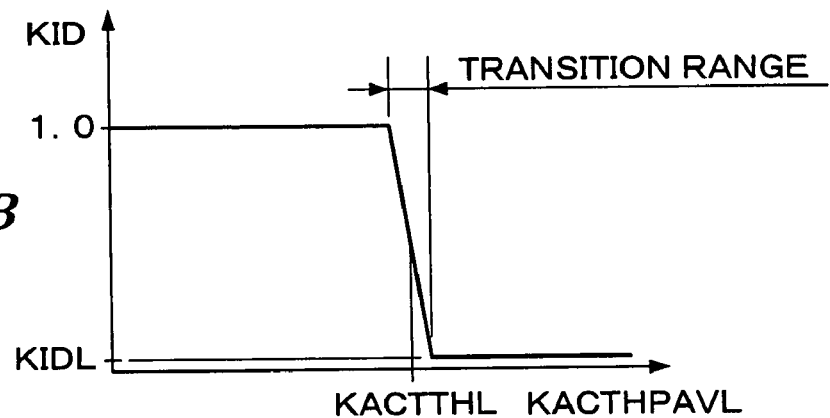

If GAIRCYL is less than or equal to GAIRHP in step S72, i.e., the engine 1 is operating in the low load operating condition, a second KID table shown in FIG. 10B is retrieved according to the second average value KACTHPAVL to calculate the spike correction coefficient KID (step S74). According to the second KID table, in the transition range in the vicinity of the second predetermined threshold value KACTTHL, the spike correction coefficient KID is set so that it decreases as the second average value KACTHPAVL increases. In the range where the second average value KACTHPAVL is less than the transition range, the spike correction coefficient KID is set to "1.0", and in the range where the second average value KACTHPAVL is greater than the transition range, the spike correction coefficient KID is set to the predetermined value KIDL (e.g., "0.01"). If the second average value KACTHPAVL is less than the transition range, it is determined that the spiky response has not been output. Accordingly, the spike correction coefficient KID is set to "1.0".

The spiky response is more unlikely to occur in the low load operating condition compared with in the high load operating condition. Therefore, the second predetermined threshold value KACTTHL is set to a greater value than the first predetermined threshold value KACTTH in order to avoid that a response due to a steady disturbance is wrongly determined to be a spiky response. By setting the threshold value for the spiky response detection according to the load on the engine, the spiky response can be determined accurately.

As described above, in the present embodiment, the detected equivalent ratio KACT is monitored, and when the spiky response output is detected, the updating rate of the model parameter vector is modified to a lower rate by changing the spike correction coefficient KID to a lower value near "0". The performance of following up the control target value is temporarily lowered by lowering the updating rate of the model parameters. Accordingly, an excessive correction corresponding to the spiky response of the detected equivalent ratio KACT can be suppressed, to thereby maintain good controllability.

In this embodiment, the engine system $1a$ corresponds to the plant as the controlled object, and the ECU 5 constitutes the identifying means, the self-tuning regulator, the spiky response detecting means, and the modifying means. Specifically, the process shown in FIG. 6 corresponds to the identifying means, and the process shown in FIG. 5 corresponds to the self-tuning regulator. Steps S63–S70 and S72–S74 in FIG. 7 correspond to the spiky response detecting means and the modifying means. The calculation process of the updating vector $d\theta$ by Eq. (5a) corresponds to the updating component calculating means, and the calculation of multiplying the spike correction coefficient KID by the updating vector $d\theta$ corresponds to the updating component correcting means. Further, steps S63, S64, and S66 correspond to the filtering means, and steps S65 and S67 correspond to the average value calculating means.

Modification

The first and second KID table shown in FIGS. 10A and 10B may be modified so that the transition range where the spike correction coefficient KID gradually decreases is omitted, i.e., the spike correction coefficient KID changes stepwise from "1.0" to the predetermined value KIDL.

When the excessive correction is performed by the self-tuning regulator immediately after generation of the lean spike, the air-fuel ratio deviates to a richer side with respect to the target air-fuel ratio. In this case, NOx emission from the engine is not degraded since the three-way catalyst 14 can purify NOx. Therefore, the spike correction coefficient KID may be reduced only when the rich spike is generated, by setting the lower threshold value DKACTKEL in step S70 to "−1", which made the answer to step S70 actually fail to become affirmative (YES) (by neglecting the lean spike and detecting the rich spike only).

Figure 11:
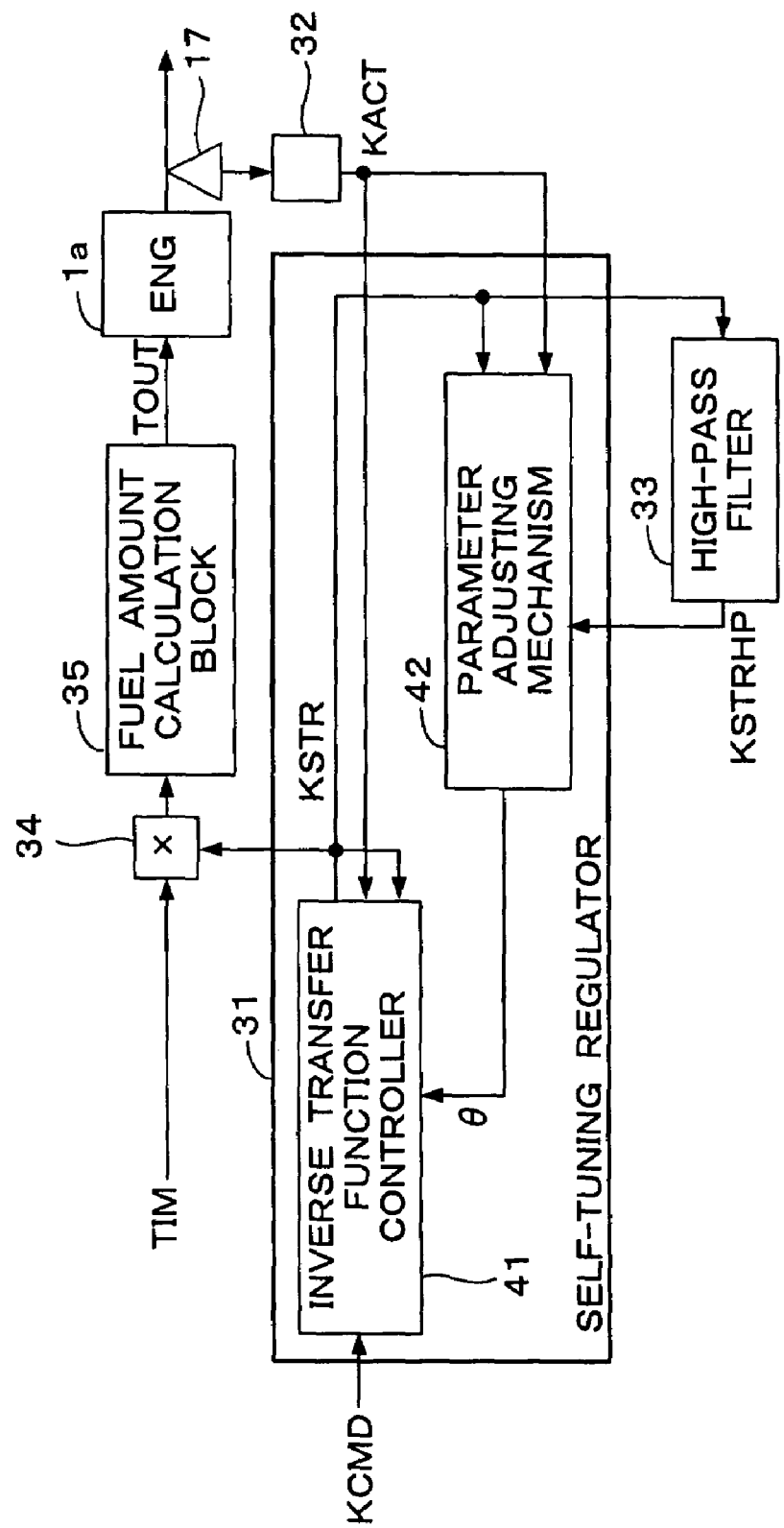
FIG. 11 is a block diagram showing a modified configuration of the control system shown in FIG. 2.

In the above described embodiment, the detected equivalent ratio KACT is input to the high-pass filter 33, and the spiky response is detected based on the high-pass filtered equivalent ratio KACTHP. Alternatively, the self-tuning correction coefficient KSTR may be input to the high-pass filter 33, as shown in FIG. 11, and the spiky response may be detected based on the high-pass filtered self-tuning correction coefficient KSTRHP. The self-tuning correction coefficient KSTR, which is an output from the self-tuning regulator, responds rapidly to a change in the detected equivalent ratio KACT. Accordingly, the self-tuning correction coefficient KSTR can be used as a parameter indicative of the output of the controlled object. This modification is advantageous when the detected equivalent ratio includes noises.

SECOND EMBODIMENT

Figure 12:
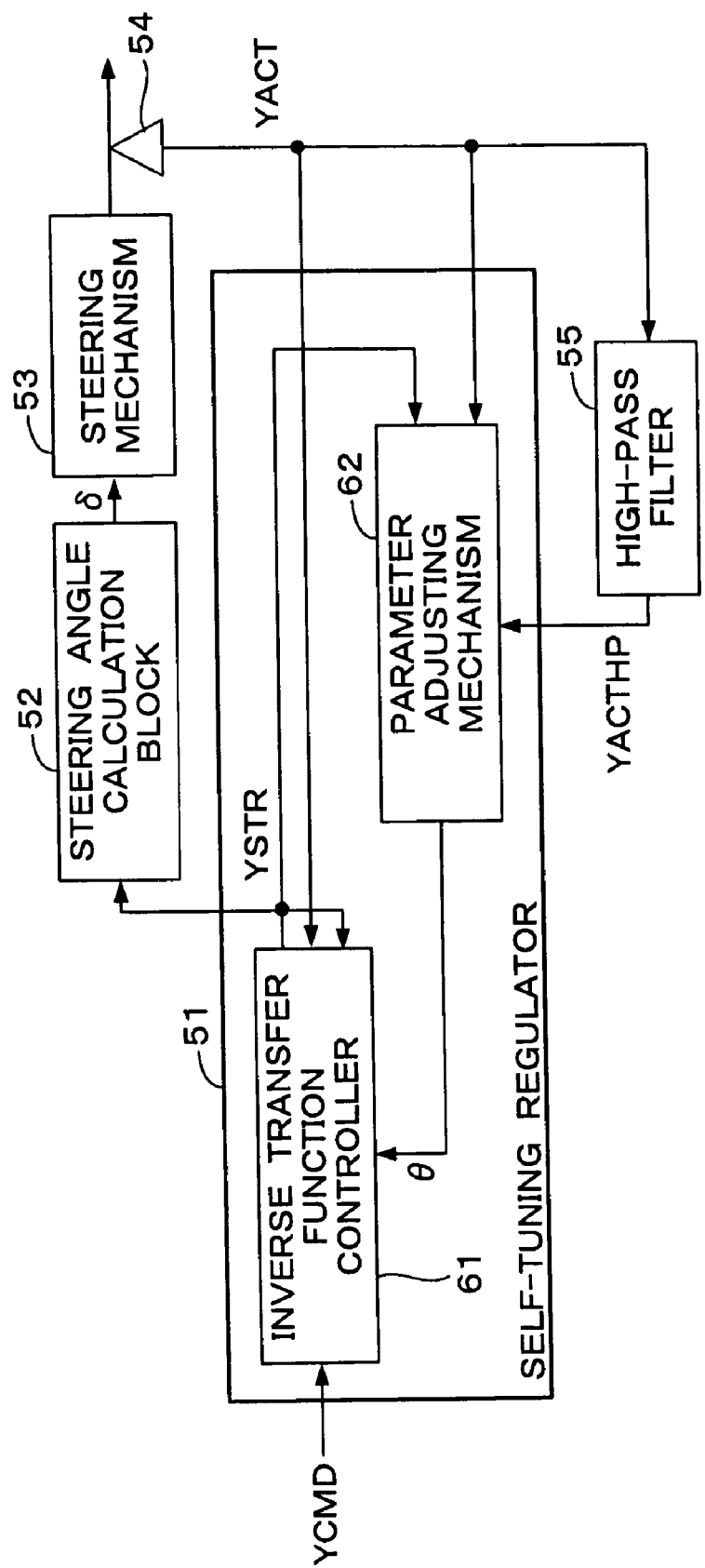
FIG. 12 is a block diagram showing a configuration of an internal combustion engine and a control apparatus therefor according to a second embodiment of the present invention.
Figure 13:
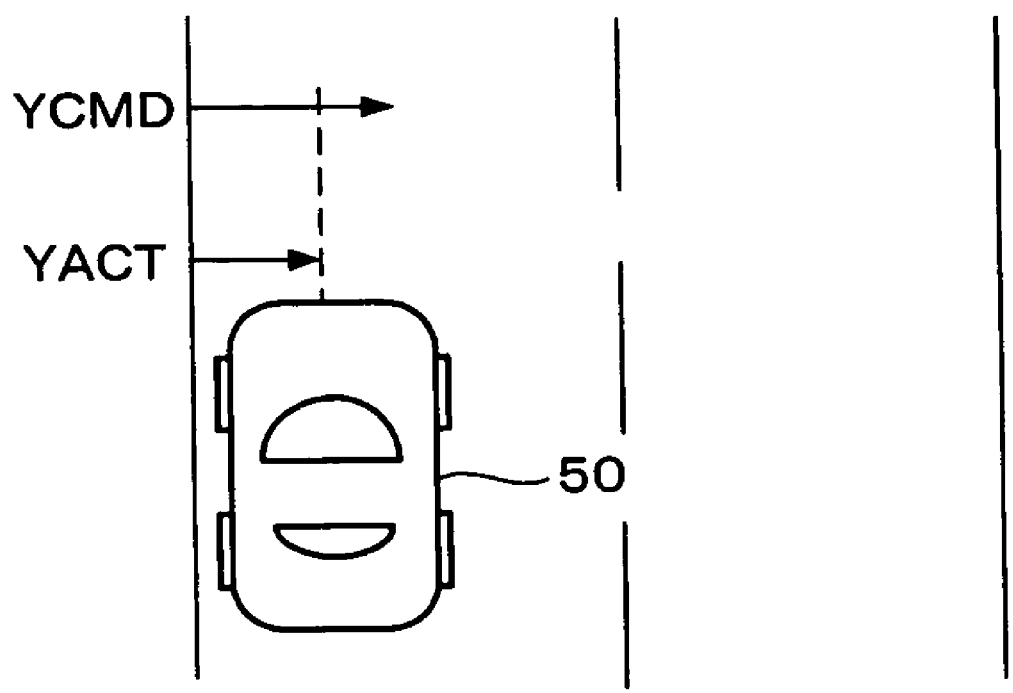
FIG. 13 is a diagram illustrating a detected parameter (YACT) in a running lane maintaining device of a vehicle, and a control target value (YCMD) of the detected parameter.
Figure 14A:
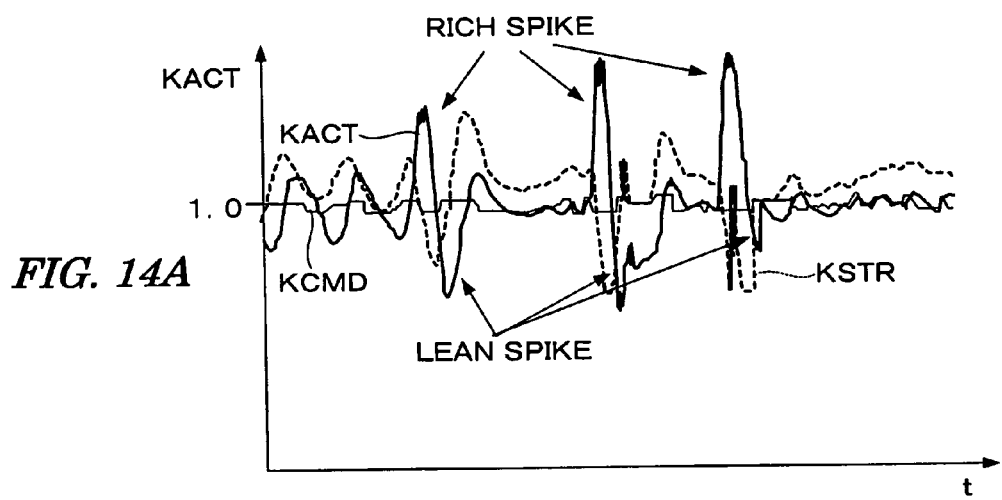
FIG. 14A–14C are time charts for illustrating a problem of the conventional control apparatus.
Figure 14B:
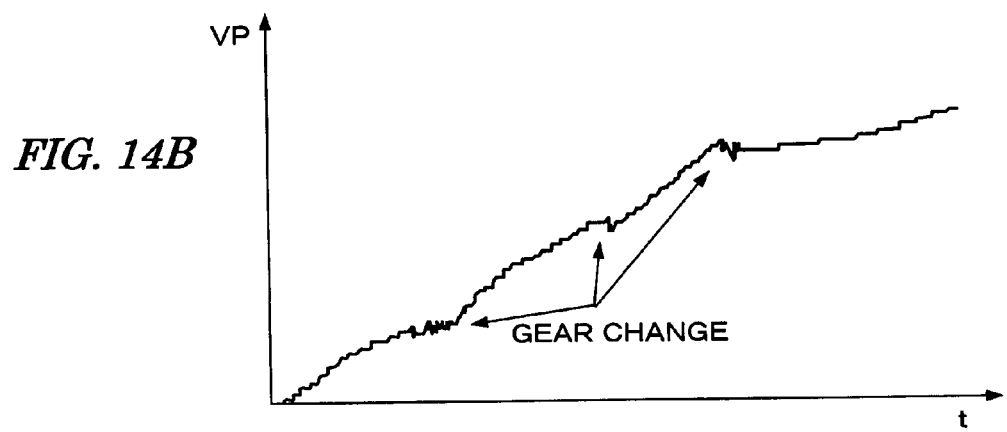
Figure 14C:

FIG. 12 is a schematic diagram showing a configuration of a control system including a running lane keeping device for a vehicle according to a second embodiment of the present invention. The running lane keeping device controls a steering angle $\delta$ of a steering wheel of the vehicle so that the distance YACT (hereinafter referred to as "actual running position"), as shown in FIG. 13, from the left end of the running lane to the center of the vehicle 50 coincides with a target running position YCMD.

The control system shown in FIG. 12 includes a self-tuning regulator 51, a steering angle calculation block 52, a steering mechanism 53, a position detector 54, and a high-pass filter 55. The self-tuning regulator 51 includes an inverse transfer function controller 61, and a parameter adjusting mechanism 62.

The position detector 54 detects the actual running position YACT based on the image obtained by a CCD camera. The high-pass filter 55 performs high-pass filtering of the actual running position YACT, and outputs a filtered running position YACTHP. The parameter adjusting mechanism 62 calculates a model parameter vector θ based on the actual running position YACT, a running position correction amount YSTR, and the filtered running position YACTHP. The inverse transfer function controller 61 calculates the running position correction amount YSTR, based on the target running position YCMD, the actual running position YACT, and past values of the running position correction amount YSTR, using the model parameter vector θ.

The steering angle calculation block 52 calculates a steering angle δ based on the running position correction amount YSTR, a running distance of the vehicle, a turning angle of the vehicle, and a friction coefficient of the road. The steering mechanism 53 steers the vehicle corresponding to the steering angle δ.

The self-tuning regulator 51 calculates the running position correction amount YSTR based on a controlled object model which is obtained by modeling the controlled object, i.e., the steering mechanism 53 and the vehicle 50 whose behavior changes with steering. The controlled object model is defined by Eq. (41) shown below, as a DARX model having a dead time of 3 control cycles.

$$YACT(k)=b0\times YSTR(k-3)+r1\times YSTR(k-4)+r2\times YSTR(k-5)+r3\times YSTR(k-6)+s0\times YACT(k-3) \quad (41)$$

where b0, r1, r2, r3, and s0 are the model parameters identified by the parameter adjusting mechanism 62.

Eq. (41) is obtained by replacing KACT and KSTR in Eq. (2) respectively with YACT and YSTR, which means that the steering mechanism 53 and the vehicle 50 can be modeled similarly to the engine system 1a. Therefore, the control method described in the first embodiment can be applied as itself. That is, the parameter adjusting mechanism 62 identifies a model parameter vector θ from Eqs. (42)–(49) shown below.

$$\theta(k)=SGM\theta(k-1)+KID\cdot d\theta(k) \quad (42)$$

$$d\theta(k)=KP(k)ide(k) \quad (43)$$

$$SGM = \begin{bmatrix} 1 & 0 & 0 & 0 & 0 \\ 0 & \sigma & 0 & 0 & 0 \\ 0 & 0 & \sigma & 0 & 0 \\ 0 & 0 & 0 & \sigma & 0 \\ 0 & 0 & 0 & 0 & \sigma \end{bmatrix} \quad (44)$$

$$KP(k) = \frac{P(k)\zeta(k)}{1+\zeta^T(k)P(k)\zeta(k)} \quad (45)$$

$$P(k+1) = \frac{1}{\lambda_1}\left(E - \frac{\lambda_2(K)\zeta(k)\zeta^T(k)}{\lambda_1+\lambda_2\zeta^T(k)P(k)\zeta(k)}\right)P(k) \quad (46)$$

(E: the unit matrix)

$$ide(k)=YACT(k)-YACTHAT(k) \quad (47)$$

$$YACTHAT(k)=\theta(k-1)^T\zeta(k) \quad (48)$$

$$\zeta(k)^T=[YSTR(k-3),\ YSTR(k-4),\ YSTR(k-5),\ YSTR(k-6),\ YACT(k-3)] \quad (49)$$

Eqs. (42)–(46) are the same as Eqs. (4)–(8), and Eqs. (47)–(49) are obtained by replacing KACT, KACTHAT, and KSTR respectively with YACT, YACTHAT, and YSTR.

The inverse function controller 61 calculates the running position correction amount YSTR from Eq. (50) shown below.

$$YSTR(k)=(1/b0)(YCMD(k)-r1\times YSTR(k-1)-r2\times YSTR(k-2)-r3\times YSTR(k-3)-s0\times YACT(k)) \quad (50)$$

In this embodiment, a spiky response is detected due to disturbance of a blast during the vehicle running. When the spiky response is detected, the spike coefficient KID is set similarly as in the first embodiment. Accordingly, an excessive correction for the spiky response is suppressed, to thereby obtain good performance of keeping the running lane.

The self-tuning regulator 51 and the high-pass filter 55 can be constituted specifically by an electronic control unit including input and output circuits, a CPU, and a memory circuit. Accordingly, the electronic control unit constitutes the identifying means, the spiky response detecting means, and the modifying means.

INDUSTRIAL APPLICABILITY

The present invention contributes to suppress excessive correction for a spiky disturbance being applied and maintain a good controllability, when controlling the plant, which is a controlled object, with the self-tuning regulator. Specifically, the present invention can be applied to an air-fuel ratio control of an internal combustion engine and a running lane keeping control of a vehicle. Further, the present invention can be applied to an air-fuel ratio control of an engine having an crank shaft mounted vertically, such as an outboard engine for driving a ship.

The invention claimed is:

1. A control apparatus for a plant, controlling said plant with a self-tuning regulator having identifying means for identifying at least one model parameter of a controlled object model which is obtained by modeling said plant, said self-tuning regulator using the at least one model parameter identified by said identifying means, said control apparatus including spiky response detecting means for monitoring a parameter indicative of an output of said plant to detect a spiky response output, wherein said identifying means includes modifying means for modifying an updating rate of the at least one model parameter to a lower rate, when the spiky response output is detected by said spiky response detecting means.

2. A control apparatus according to claim 1, wherein said identifying means further includes updating component calculating means for calculating at least one updating component corresponding to the at least one model parameter, and updating component correcting means for calculating at least one corrected updating component by multiplying a correction coefficient by the at least one updating component, said identifying means calculating a present value of the at least one model parameter by adding at least one corrected updating component to a preceding value of the at least one model parameter, said modifying means modifying the correction coefficient so that an absolute value of the correction coefficient decreases, when the spiky response output is detected by said spiky response detecting means.

3. A control apparatus according to claim 1, wherein said spiky response detecting means includes filtering means for performing a high-pass filtering of the parameter indicative of the output of said plant, and detects the spiky response output according to an output of said filtering means.

4. A control apparatus according to claim 3, wherein said spiky response detecting means includes average value calculating means for calculating an average value by averaging absolute values of a present output and a stored output of said filtering means, said stored output being stored at a time a predetermined time period before, said spiky response detecting means determining that the spiky response has been output, when said average value exceeds a predetermined threshold value.

5. A control apparatus according to claim 1, wherein said spiky response detecting means determines a direction of the spiky response output and detects only a spiky response output having a predetermined direction.

6. A control apparatus according to claim 1, wherein the parameter indicative of the output of said plant is an output of said self-tuning regulator.

7. A control apparatus according to claim 1, wherein said plant includes an engine system having an internal combustion engine and fuel supplying means for supplying fuel to said engine, and said self-tuning regulator calculates a parameter that determines a control input to said engine system so that an air-fuel ratio of an air-fuel mixture supplied to said engine coincides with a target air-fuel ratio.

8. A control apparatus according to claim 3, wherein said plant includes an engine system having an internal combustion engine and fuel supplying means for supplying a fuel to said engine, and said self-tuning regulator calculates a parameter that determines a control input to said engine system so that an air-fuel ratio of an air-fuel mixture supplied to said engine coincides with a target air-fuel ratio, a filtering characteristic of said high-pass filtering being changed according to an operating condition of said engine.

9. A control apparatus according to claim 4, wherein said plant includes an engine system having an internal combustion engine and fuel supplying means for supplying a fuel to said engine, and said self-tuning regulator calculates a parameter that determines a control input to said engine system so that an air-fuel ratio of an air-fuel mixture supplied to said engine coincides with a target air-fuel ratio, said predetermined threshold value being changed according to an operating condition of said engine.

10. A control method for controlling a plant with a self-tuning regulator, said control method comprising the steps of:

a) identifying at least one model parameter of a controlled object model which is obtained by modeling said plant; and b) controlling said plant with said self-tuning regulator using the identified at least one model parameter, c) monitoring an output parameter indicative of an output of said plant to detect a spiky response output;

wherein an updating rate of the at least one model parameter is modified to a lower rate, when the spiky response output is detected at said step c).

11. A control method according to claim 10, wherein said step a) of identifying the at least one model parameter comprises the steps of:

i) calculating at least one updating component corresponding to the at least one model parameter;

ii) calculating at least one corrected updating component by multiplying a correction coefficient by the at least one updating component; and iii) calculating a present value of the at least one model parameter by adding at least one corrected updating component to a preceding value of the at least one model parameter, the correction coefficient being modified so that an absolute value of the correction coefficient decreases, when the spiky response output is detected at said step c).

12. A control method according to claim 10, wherein said step c) of monitoring the output parameter comprises the steps of:

i) performing a high-pass filtering of said output parameter; and ii) detecting the spiky response output according to the filtered output parameter.

13. A control method according to claim 12, wherein said step ii) of detecting the spiky response output comprises the steps of:

iii) calculating an average value by averaging absolute values of a present filtered output parameter and a filtered output parameter that is stored at a time a predetermined time period before; and iv) determining that the spiky response has been output, when said average value exceeds a predetermined threshold value.

14. A control method according to claim 10, wherein a direction of the spiky response output is determined and only a spiky response output having a predetermined direction is detected.

15. A control method according to claim 10, wherein the output parameter indicative of the output of said plant is an output of said self-tuning regulator.

16. A control method according to claim 10, wherein said plant includes an engine system having an internal combustion engine and a fuel supplying device for supplying fuel to said engine, and said self-tuning regulator calculates a parameter that determines a control input to said engine system so that an air-fuel ratio of an air-fuel mixture supplied to said engine coincides with a target air-fuel ratio.

17. A control method according to claim 12, wherein said plant includes an engine system having an internal combustion engine and a fuel supplying device for supplying a fuel to said engine, and said self-tuning regulator calculates a parameter that determines a control input to said engine system so that an air-fuel ratio of an air-fuel mixture supplied to said engine coincides with a target air-fuel ratio, a filtering characteristic of said high-pass filtering being changed according to an operating condition of said engine.

18. A control method according to claim 13, wherein said plant includes an engine system having an internal combustion engine and a fuel supplying device for supplying a fuel to said engine, and said self-tuning regulator calculates a parameter that determines a control input to said engine system so that an air-fuel ratio of an air-fuel mixture supplied to said engine coincides with a target air-fuel ratio, said predetermined threshold value being changed according to an operating condition of said engine.

19. A computer readable medium storing a computer program for causing a computer to carry out a control method for controlling a plant with a self-tuning regulator, said control method comprising the steps of:

a) identifying at least one model parameter of a controlled object model which is obtained by modeling said plant; and b) controlling said plant with said self-tuning regulator using the identified at least one model parameter, c) monitoring an output parameter indicative of an output of said plant to detect a spiky response output;

wherein an updating rate of the at least one model parameter is modified to a lower rate, when the spiky response output is detected at said step c).

20. A computer readable medium according to claim 19, wherein said step a) of identifying the at least one model parameter comprises the steps of:
   i) calculating at least one updating component corresponding to the at least one model parameter;
   ii) calculating at least one corrected updating component by multiplying a correction coefficient by the at least one updating component; and
   iii) calculating a present value of the at least one model parameter by adding at least one corrected updating component to a preceding value of the at least one model parameter,
   the correction coefficient being modified so that an absolute value of the correction coefficient decreases, when the spiky response output is detected at said step c).

21. A computer readable medium according to claim 19, wherein said step c) of monitoring the output parameter comprises the steps of:
   i) performing a high-pass filtering of said output parameter; and
   ii) detecting the spiky response output according to the filtered output parameter.

22. A computer readable medium according to claim 21, wherein said step ii) of detecting the spiky response output comprises the steps of:
   iii) calculating an average value by averaging absolute values of a present filtered output parameter and a filtered output parameter that is stored at a time a predetermined time period before; and
   iv) determining that the spiky response has been output, when said average value exceeds a predetermined threshold value.

23. A computer readable medium according to claim 19, wherein a direction of the spiky response output is determined and only a spiky response output having a predetermined direction is detected.

24. A computer readable medium according to claim 19, wherein the output parameter indicative of the output of said plant is an output of said self-tuning regulator.

25. A computer readable medium according to claim 19, wherein said plant includes an engine system having an internal combustion engine and a fuel supplying device for supplying fuel to said engine, and said self-tuning regulator calculates a parameter that determines a control input to said engine system so that an air-fuel ratio of an air-fuel mixture supplied to said engine coincides with a target air-fuel ratio.

26. A computer readable medium according to claim 21, wherein said plant includes an engine system having an internal combustion engine and a fuel supplying device for supplying a fuel to said engine, and said self-tuning regulator calculates a parameter that determines a control input to said engine system so that an air-fuel ratio of an air-fuel mixture supplied to said engine coincides with a target air-fuel ratio, a filtering characteristic of said high-pass filtering being changed according to an operating condition of said engine.

27. A computer readable medium according to claim 22, wherein said plant includes an engine system having an internal combustion engine and a fuel supplying device for supplying a fuel to said engine, and said self-tuning regulator calculates a parameter that determines a control input to said engine system so that an air-fuel ratio of an air-fuel mixture supplied to said engine coincides with a target air-fuel ratio, said predetermined threshold value being changed according to an operating condition of said engine.

* * * * *